June 14, 1932.  E. E. ALLYNE  1,862,646

ABSORPTION REFRIGERATING APPARATUS

Original Filed Feb. 7, 1929   2 Sheets-Sheet 1

INVENTOR
EDMUND E. ALLYNE
BY
Brockett, Hyde, Higley & Mayer
ATTORNEYS

June 14, 1932.   E. E. ALLYNE   1,862,646
ABSORPTION REFRIGERATING APPARATUS
Original Filed Feb. 7, 1929   2 Sheets-Sheet 2

INVENTOR
EDMUND E. ALLYNE
BY
Brockett, Hyde, Higley & Meyer
ATTORNEYS

Patented June 14, 1932

1,862,646

UNITED STATES PATENT OFFICE

EDMUND E. ALLYNE, OF CLEVELAND HEIGHTS, OHIO

ABSORPTION REFRIGERATING APPARATUS

Application filed February 7, 1929, Serial No. 338,175. Renewed November 14, 1931.

This invention relates to refrigerating apparatus of the absorption type.

The invention described in this application has for its objects the provision of a unique form of evaporating storage; the provision of a unique form of heat absorber associated with the storage and with a refrigerating unit and heat insulated ice cube compartment, all arranged in the top of the box and adapted to control the heat of the box and heat of the evaporator during heating period in such a manner that the temperature of the box and of the ice cubes does not suffer a rise upon the lapse of refrigeration during heating period. In other words the evaporator and its storage are provided with a suitable heat absorber so associated with the parts that it will act as a holdover and maintain the temperature of the box at the proper point from one refrigerating cycle to the other.

Another object of the invention is to control the cycles of the box by a thermostatic device subject to the changes in temperature of the heat absorber or flywheel. In the instance shown one part of the controlling device is imbedded in a cake of ice associated with the evaporator and as the temperature rises and falls in this holdover the gas or other fuel is turned off and on.

The invention is very well exemplified in the following description, drawings, and claims.

Figure 1:
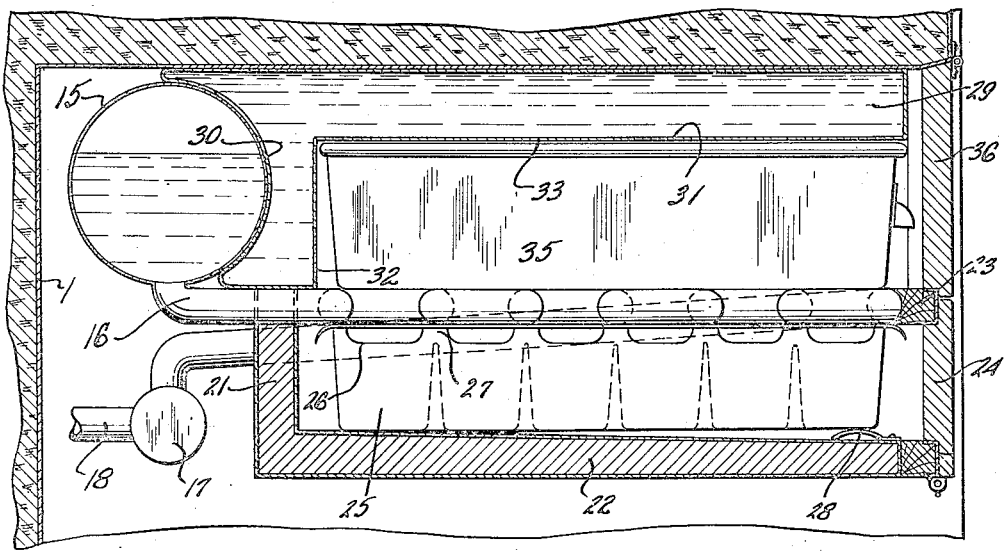
Figure 2:
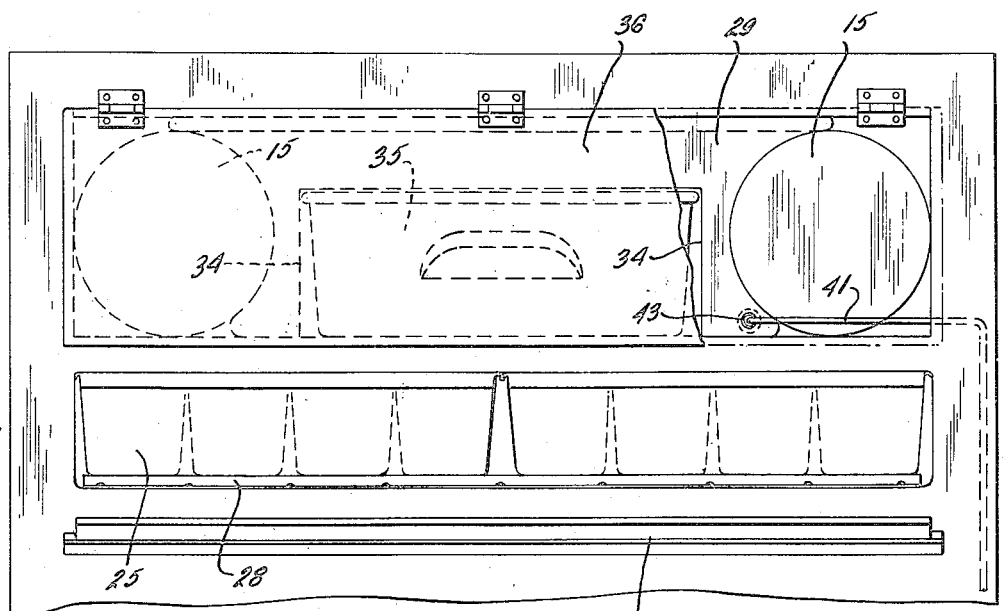
Figure 3:
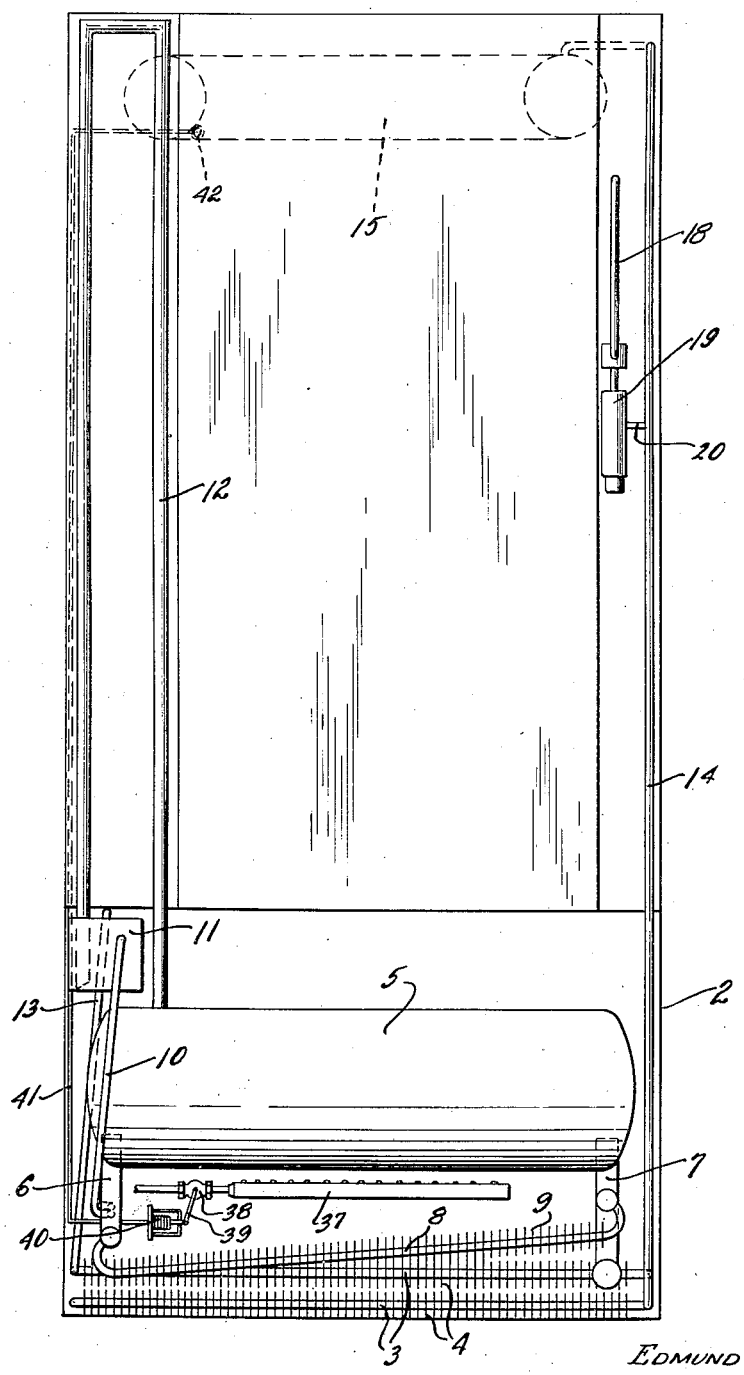

In the drawings; Fig. 1 is a view partly in side elevation and section showing the upper part of the refrigerating chamber; Fig. 2 is the front elevation partly in section and partly broken away; and Fig. 3 is a rear elevation of the icebox or cabinet.

In the arrangement shown the cabinet or box comprises the refrigerating chamber casing 1 supported upon and forming a part of the apparatus casing 2. The front of the refrigerating chamber is closed by a door, not shown, in the usual manner.

The absorption apparatus itself forms no special part of the invention except insofar as it enters into the combination. Briefly, it comprises a condenser consisting of coils of pipe 3 provided with air cooling fins 4 and arranged preferably at the bottom of the apparatus casing. Above this condenser is a still absorber or tank 5 preferably arranged horizontally and having suitable conduits 6 and 7 communicating with the still and connected by air cooled coils or pipes 8 having fins 9. Some of these conduits such as 6 are connected by a loop gas return pipe 10 to the side of the trap casing 11 near the top thereof. Extending upwardly from the top of the still absorber and at the back of the box is a rectifier loop 12, the outer end of this loop extending within and near the bottom of the trap casing 11. The top of the trap casing is connected to a condenser pipe 13 leading to the top of the condenser. The bottom of the condenser is connected to a pipe 14 which leads to the evaporator mechanism as will appear.

The evaporator mechanism which forms an important part of this application comprises a U-shaped storage tank 15 arranged near the top of the box and extending along back with its legs extending forward horizontally near the top. It is shown round in cross section but may be of any shape in this regard. This U-shaped storage is connected at its top to the pipe 14. Extending from the bottom of this storage is a refrigerating unit or grid formed of coils of pipe 16. The end of this coil of pipe extends downwardly and enters a sump 17 which communicates by a pipe 18 with a trap generally indicated at 19, and also connected by a pipe 20 with the pipe 14 below the evaporator as shown in Fig. 3. This trap 19 is of a type now familiar in this art and is adapted to support a proper column of liquid refrigerant in the evaporator and bypass back through the pipe 14 to the condenser and thence to the still any boiler liquor which may be sufficiently entrained with the gas and collected in the evaporator. Extending below the refrigerating unit or grid is an insulating housing comprising a back wall 21 extending from one side of the refrigerating chamber to the other, and leaving at the rear of the box a suitable heat channel to permit the heat of the refrigerating chamber to rise to the top of the box above the ice cubes as will appear. This housing comprises the back wall 21 and a bottom wall 22 extending to the front and from side to side of the box. In horizontal alignment with the grid there is a cross insulating strip 23 and between this strip and the bottom wall 22 is a suitable hinged door 24 forming a closure for the front of this housing. It will be seen that this housing forms with the grid a convenient chamber for ice cube containers 25 which may be slid into the compartment by opening the door 24 at the front. The bottom floor of this compartment is preferably inclined toward the front and of such vertical dimension that the cube containers will slide upon the bottom at the back and be forced upwardly against the grid, the containers being cut out at 26 upon their sides and leaving intermediate heat conducting fins 27 to contact with the coils of the pipe of the grid to permit ready heat transfer from the container to the grid. At the front the floor of this housing may be provided with suitable spring means 28 for forcing the ice containers up against the grid at the front. This spring means also serves to permit the ready release of the cube containers when frozen.

In the compartment formed above the grid is a heat absorber in this instance shown as a pan or container 29 having its back and side walls shaped or curved as at 30 to nest against the outer face of the wall of the storage tank to permit free transfer of heat between the storage and the container. This container is supplied with a heat absorbing liquid and preferably a freezing liquid such as water whereby during the cooling period a large flywheel of ice is formed in the container and it is adapted to absorb heat from the storage during the heating period or cycle and give up its heat during the cooling period.

In order to provide an extra supply of ice for use and yet to retain sufficient ice capacity in the heat absorber, the container 29 is provided with an inner shell 31 comprising a back vertical wall 32 spaced from the wall 30, upper wall 33 and side walls 34. This shell is open at the front and within the chamber thus formed an ice container may be slid. The front of this chamber is closed by a hinged door 36 which may conveniently swing upwardly and outwardly. This entire mechanism including its doors 24 and 36 is within the main door of the refrigerating chamber.

It will be seen from the foregoing that during the heating period the liquid refrigerant entering the storage will give up its heat to the holdover of ice in the container 29 and any heat present in the refrigerating chamber will be absorbed by this same holdover and the temperature of the ice in the cube containers and in the container 35 will be maintained.

Another part of the invention is the control of the heat. In the embodiment set out in the drawings it is somewhat diagrammatic but will serve as a foundation for claims in this case. In the instance shown the still is provided with a gas burner 37 having a suitable valve 38 controlled by a lever 39 which in turn is connected to suitable pressure operated bellows 40 connected by a tube 41 with a closed end portion 42 arranged in a well 43 in the heat absorber casing 29. The tube 41 and bellows 40 are supplied with a suitable non-freezing liquid. As the temperature of the heat absorber varies the expansion of the liquid in the device will affect the turning off and on of the gas to the burner. It is obvious that this thermostatic control device may actuate any other type of heating means.

It is obvious that this control cannot be a complete control for manipulating the heat for all of the cycles of operation and further control mechanism, not shown, will obviously have to be added to complete the entire operation of the apparatus. For example, this control could be used to turn on the gas at the end of a refrigerating cycle as a result of a rise in temperature of the heat absorber or holdover and additional mechanism would have to be provided for turning off the gas to maintain the proper cycle.

What I claim is:

1. In absorption refrigerating apparatus, a cabinet having a refrigerating chamber, a refrigerant storage within and adjacent the top of said refrigerating chamber, a refrigerating unit in liquid gravitating communication with said storage, a housing for said refrigerating unit and comprising a heat absorber forming the upper part of said housing and in heat transfer relation to said storage and to said refrigerating unit, and a heat insulating casing forming the remaining portion of said housing.

2. Refrigerating apparatus as in claim 1 wherein the absorber is in the form of a pan having its sides nested about and in heat transferring relation to said storage.

3. Refrigerating apparatus as in claim 1 wherein the storage is of U-shape with the legs of the U extending out to the front, a container having recessed sides and back walls nesting in heat transfer relation with said storage and adapted to contain a freezing liquid.

4. In absorption refrigerating apparatus, a still absorber and condenser connected in operative cycle, a storage and evaporator in liquid gravitating communication with said storage, a heat absorber separate from said evaporator and in heat transfer relation with respect to said storage and said evaporator, a heater for said still, and control means for said heater and including a thermostatic element associated with said heat absorber.

In testimony whereof I hereby affix my signature.

EDMUND E. ALLYNE.